United States Patent [19]

Andrade et al.

[11] Patent Number: 5,293,624
[45] Date of Patent: Mar. 8, 1994

[54] DATA CHAINING MECHANISM FOR SCSI DEVICES

[75] Inventors: Gustavo Andrade, San Jose; Mathew Gulick, Gilroy; Gerald Katzung, San Jose, all of Calif.

[73] Assignee: Apple Computer, Inc, Cupertino, Calif.

[21] Appl. No.: 63,637

[22] Filed: May 19, 1993

Related U.S. Application Data

[63] Continuation of Ser. No. 573,462, Aug. 27, 1990, abandoned.

[51] Int. Cl.⁵ .............................................. G06F 12/02
[52] U.S. Cl. ............................... 395/425; 364/DIG. 1; 364/251.5; 364/252.6; 364/254.1; 364/254.2
[58] Field of Search .............................. 395/400, 425; 364/200 MS File, 900 MS File

[56] References Cited

U.S. PATENT DOCUMENTS

| | | | |
|---|---|---|---|
| 4,718,003 | 1/1988 | Andersen et al. | 395/200 |
| 4,773,005 | 9/1988 | Sullivan | 395/275 |
| 4,945,479 | 7/1990 | Rusterholz et al. | 395/800 |
| 5,175,822 | 12/1992 | Dixon et al. | 395/275 |

Primary Examiner—Joseph L. Dixon
Assistant Examiner—Hiep T. Nguyen
Attorney, Agent, or Firm—Blakely, Sokoloff, Taylor & Zafman

[57] ABSTRACT

A mechanism for exchanging information between SCSI devices which allows for specifying multiple source or destination buffers. The mechanism includes a first apparatus for generating at least one move instruction which when executed by the SCSI manager either writes or reads the specified number of bytes to or from that buffer address and subsequently adds the offset field value to the buffer address to create a current buffer address. The current buffer address and the buffer address may be non-contiguous. The mechanism also has a second apparatus for generating at least one looping instruction by which the SCSI manager branches the offset number of instructions until the number is exhausted. This allows the SCSI manager to repeat instructions. During each repetition of the move instruction, the buffer address location gets incremented by the value in the offset field. This incrementing allows buffer locations to be accessed that are non-contiguous; thus, multiple source and destinations can be created and they can be non-contiguous.

21 Claims, 3 Drawing Sheets

DATA CHAINING MECHANISM FOR SCSI DEVICES

This is a continuation of application Ser. No. 07/573,462, filed Aug. 27, 1990 now abandoned.

FIELD OF THE INVENTION

The invention relates to the field of data management in computer systems; particularly to the area of data transfer operations.

BACKGROUND OF THE INVENTION

The Small Computer Standard Interface (SCSI) is a specification of the mechanical, electrical, and functional standards followed when coupling small computers to intelligent peripherals such as hard disks, printers, and optical disks. Typically, a part of the operating system, the SCSI manager, is employed to provide routines and data structures to control the exchange of information between the small computer and the peripheral devices.

Devices are usually connected to a SCSI bus in a daisy-chain configuration. When two SCSI devices communicate with each other, one acts as an "initiator" and the other as a "target." The initiator asks the target to perform a certain operation, such as reading a block of data. Before any operation can occur, the initiator must first gain control of the bus, select a target device, and then instruct the target device regarding which operation is to be performed.

When the command to be performed involves a transfer of data, a pointer must be passed to a transfer instruction block which indicates to the SCSI manager how the data is to be manipulated. In the prior art, data could only be read from or written into contiguous memory locations. Moreover, data transfers which required multiple buffers to be used, would have to be separated into several calls to the operating system. Furthermore, during actual data transfer process, the running of application procedures between calls to the operating system caused a loss of system performance.

As will be seen, the present invention involves a mechanism which allows data to be read from or written into memory non-contiguously. Moreover, a single buffer may be employed repeatedly without having to divide a transaction into several calls to the operating system. The present invention also includes a mechanism which allows for application routines to be called in between data calls of an actual data transfer process without loss to system performance.

SUMMARY OF INVENTION

In a computer system having a Small Computer Standard Interface (SCSI) and a SCSI manager, a data chaining mechanism for exchanging information between SCSI devices which allows for specifying multiple source or destination buffers. In one embodiment, the mechanism includes a first apparatus for generating at least one move instruction in the format of a first opcode field containing a buffer address representing a move command, a first count field containing a number specifying an amount of bytes to transfer, a first offset field containing a value to add to the buffer address, and a first save pointer field. The SCSI manager executes the move instruction in which the SCSI manager either writes or reads the amount of bytes to or from the buffer address and subsequently adds the value to the buffer address to create a current buffer address, wherein the current buffer address and the buffer address may be non-contiguous.

The mechanism also includes a second apparatus for generating at least one looping instruction in the format of a second opcode field containing a loop command, a second count field containing a number corresponding to the number of iterations, a second offset field containing an offset number of instructions to branch from the move instruction, and a second save pointer field. When executing a looping instruction, the SCSI manager branches the offset number of instructions until the number of loop times is zero such that the SCSI manager repeats the move instruction the specified number of loop times, during which time the SCSI manager either writes or reads the amount of bytes to or from the current buffer address.

A third apparatus generates a stop instruction in the format of a third opcode field containing a stop command, a third count field containing a zero, a third offset field containing a zero, and a third save pointer field. The SCSI manager completes execution of the data chaining instructions upon encountering the stop instruction.

The mechanism further includes a fourth apparatus which generates at least one special instruction in the format of a fourth opcode field containing a special command, a fourth count field containing a branch address to a routine, a fourth offset field containing data as defined by the routine referenced by the branch address, and a fourth save pointer field. Upon execution, the SCSI manager relinquishes control of the SCSI either before or after the one move instruction or after the one loop instruction causing the execution the remaining instructions by the SCSI manager to be halted for a predetermined time during which the routine at the branch address is executed. After the predetermined time, the SCSI manager assumes control and completes execution of any remaining data chaining instructions.

DETAILED DESCRIPTION OF THE PRESENT INVENTION

A mechanism for exchanging information between SCSI devices which allows for specifying multiple source and destination buffers is described. In the following description, numerous specific details are set fourth such as specific computer components, bit lengths, etc., in order to provide a thorough understanding of the present invention. It will be obvious, however, to one skilled in the art that the present invention may be practiced without these specific details. In other instances, well-known components, structures and techniques have not been shown in detail to avoid unnecessarily obscuring the present invention.

Overview of the Computer System

Figure 1:
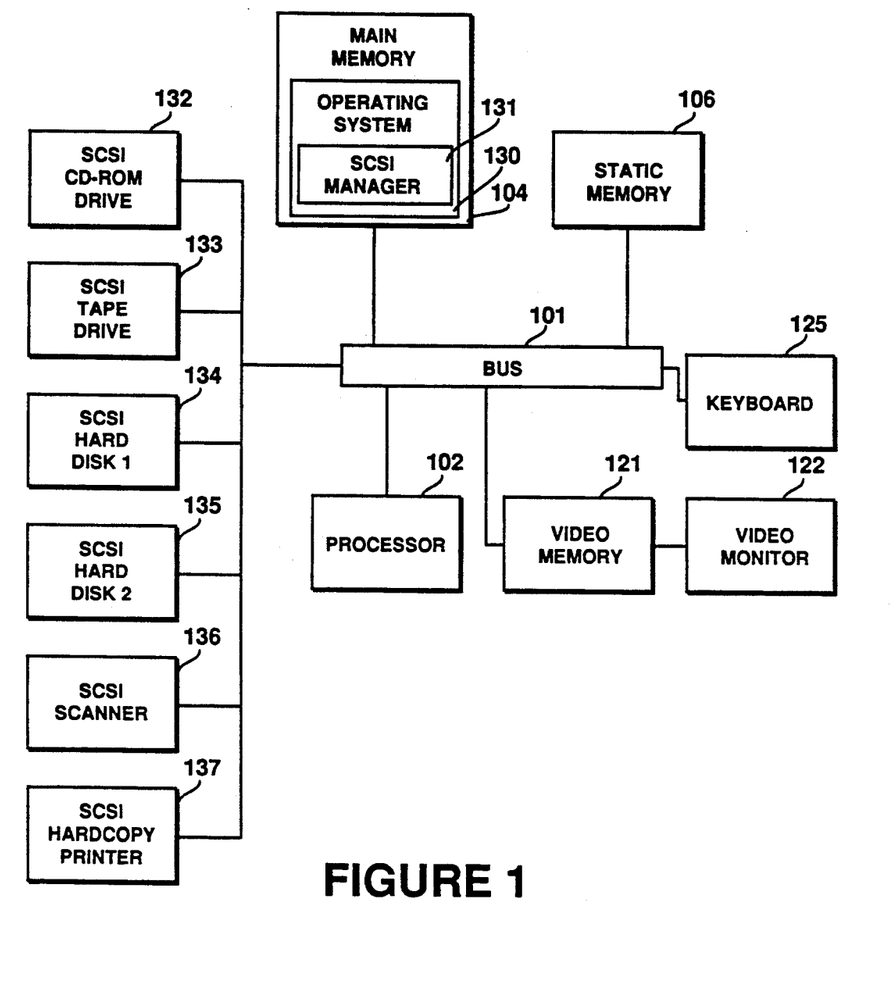
FIG. 1 is an illustration of the computer system architecture of the present invention.

Referring first to FIG. 1, an overview of a computer system of the present invention is shown in block diagram form. It will be understood that while FIG. 1 is useful for providing an overall description of the computer system of the present invention, a number of details of the system are not shown. As necessary for disclosure of the present invention, further detail is set forth with reference to the other figures provided with this specification. Further, the present invention is described with reference to its preferred embodiment; alternative embodiments which may be conceived by one of ordinary skill in the art are considered within the scope of the claims set forth below.

The present invention may be implemented on a general purpose microcomputer, such as one of the members of the Apple II or Apple Macintosh TM family, one of the members of the IBM Personal Computer family, or one of several graphic computer devices which are presently commercially available. Of course, the present invention may also be implemented on a multi-user system while encountering all of the cost, speed and function advantages and disadvantages available with these machines. The currently preferred embodiment of the present invention is implemented on an Apple II computer system.

In any event, the computer system of the currently preferred embodiment, generally comprises a bus 101 for communicating information coupled to a processor 102. A random access memory (RAM) 104 (commonly referred to as a main memory) is coupled to bus 101 for storing information and instructions for processor 102. Read only memory (ROM) 106 is coupled to bus 101 for storing static information and instructions for processor 102. Display device 122, such as a cathode ray tube, liquid crystal display, etc., is coupled to bus 101, by way of a video memory 121, for displaying information to the computer user. An alphanumeric input device 125 including alphanumeric and other keys, etc., is coupled to bus 101 for communicating information and command selections to processor 102 and for controlling cursor movement.

Also connected to bus 101 are SCSI devices. These SCSI devices include SCSI CD-ROM 132, SCSI tape drive 133, SCSI hard disk 134, SCSI hard disk 135, SCSI scanner 136, and SCSI printer 137. Each of SCSI devices 132-135 provide storage facilities and is accessed via the SCSI manager 131 which resides as part of the operating system 130 that is stored in the main memory 104. SCSI scanner 136 provides a means to input hardcopy information directly into the computer system. Finally, SCSI printer 137 provides permanent copies of information.

Of course, certain implementations and uses of the present invention may not require nor include all of the above components. For example, in certain implementations a keyboard and cursor control device for inputting information to the system may not be required. In other implementations, it may not be required to provide a display device for displaying information.

Operation of the Present Invention

Figure 2:
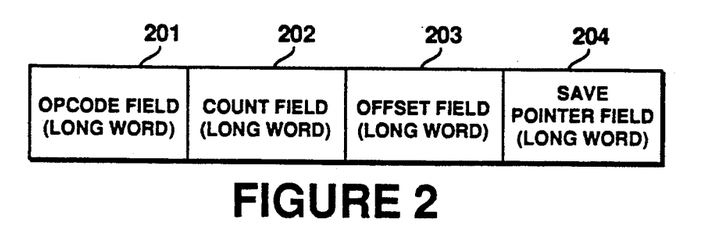
FIG. 2 is the format of a data chaining instruction of the present invention.

SCSI manager 131 automatically initializes at system start-up and is employed to perform an operation when access to a SCSI device is requested. Access is requested when a pointer is passed to a command descriptor block. If the command to be performed involves a transfer of data (e.g., a read or write operation), a pointer to a data chaining instruction block is also passed. The data chaining instruction block contains structures which specify data chaining. Data chaining is a mechanism which allows for the specification of multiple source or destination buffers without requiring one entry for each buffer address. Thus, the datachaining instruction block instructs SCSI manager 131 how the transferred data bytes are to be distributed during the data phase, and SCSI manager 131 invokes its logic to execute each instruction in the block. The format of the data chaining instructions in the data chaining instruction block is shown in FIG. 2. Each data chaining instruction consists of four long word fields and are in the computer system's native format. The first field, opcode field 201, is an opcode which describes the action to be performed. The second field, count field 202, is a generic count specific specific to the opcode in opcode field 201. The third field, offset field 203, is a generic offset specific to the opcode in opcode field 201. Lastly, the fourth field, save pointer field 204, is for use by SCSI manager 131 and is set to zero.

The first field, opcode field 201, defines the type of instruction. There are three data chaining instructions that compose the data chaining structure. By various combinations, data can be gathered and distributed depending on the direction of transfer. The three data chaining instruction types are: DCMove, DCLoop and DCStop. A variation of the DCStop, the DCSpecial, offers an alternate data chaining structure.

A DCMove instruction is defined where the value in opcode field 201 is between $00000001-$FFFFFFFE hexadecimal. In other words, when the value in opcode field 201 is not zero ($00000000) or $FFFFFFFF, the data chaining instruction is a DCMove instruction. The long word value in the opcode field for the DCMove instruction is treated as a buffer address. The buffer address in the opcode field need only be a valid address for the system.

Where opcode field 201 contains a DCMove instruction, count field 202 defines the requested number of bytes to transfer, and the offset field 203 contains the value to add to the buffer address after the requested number of bytes have been transferred. Save pointer field 204 is reserved for use by SCSI manager 131 and is set to zero.

When a DCMove data chaining instruction is executed, SCSI manager 131 waits for the device that is reading or writing the data to be ready, and then the requested number of bytes specified in count field 202 is read from or written to the buffer address stored in opcode field 201. The type of operation, normally a read or write, is determined when the data transfer is occurring. Once the data transfer is completed, the value in offset field 203 is added to the buffer address in opcode field 201 and the result is stored in opcode field 201. Thus, if a particular DCMove data chaining instruction is repeated during the next pass by SCSI manager 131, a new buffer address is used in the data transfer.

A DCLoop instruction is defined where the value in opcode field 201 is $FFFFFFFF. In other words, where the value in opcode field 201 is a negative one (−1), a DCLoop instruction is defined. If the instruction is a DCLoop instruction, count field 202 defines the number of iterations to be performed. Thus, count field 202 corresponds to the number of times the loop instruction is to be executed. For a DCLoop instruction, offset field 203 contains the relative offset from the current data chaining instruction to the next instruction to be executed if the count is not exhausted. As in the case of a DCMove instruction, save pointer field 204 is set to zero.

When a DCLoop data chaining instruction is executed, the instructions in the data chaining instruction block that are within the offset number of instructions from the DCLoop instruction are repeated until the loop count, as specified in count field 202, is exhausted.

A DCStop instruction is defined where the value in opcode field 201 is $00000000. If the instruction is a DCStop instruction, count field 202 and offset field 203 must be zero. As in the case of the DCMove and DCLoop instructions, save pointer field 204 is set to zero. The execution of a DCStop data chaining instruction indicates that no more executable data chaining instructions exist.

A special variety of the DCStop data chaining instruction exists where count field 202 does not contain a zero. If count field 202 in the DCStop instruction is nonzero, then count field 202 contains a branch address to a routine through which SCSI manager 131 passes control. This special DCStop instruction is called a DCSpecial data chaining instruction. With a DCSpecial instruction, the routine address can be any address in memory. Also, offset address 203 can hold data as defined by the routine being referenced at the address. This instruction can be used by the application calling the SCSI device to carry out an action which must occur during the middle of the data transfer. Upon returning to the execution in the data chaining environment, the system must be set exactly as it was when SCSI manager 131 passed control.

As an example, assume now that a SCSI device is to receive sixteen groups of data, each of which is $800 bytes. The data is to be stored in the buffers $3000 bytes apart from each other, starting at buffer address $2000. The present invention accomplishes the transfer in three data chaining instructions. A first data chaining instruction is generated with the starting buffer address $2000 in opcode field 201, the number of bytes being transferred, $800, in count field 202, the offset value, $3000, in offset field 203, and a zero in save pointer field 204. This instruction is a DCMove instruction which, when executed, allows $800 bytes of data, as specified in count field 202, to be stored at buffer address $2000, as specified in opcode field 201. After the data has been stored, the value $3000, as specified in offset field 203, is added to the buffer address in opcode field 201 and stored in opcode field 201.

A second data chaining instruction is generated with a negative one in opcode field 201, the number sixteen in count field 202, a negative one (−1) in offset field 203, and a zero in save pointer field 204. The second data chaining instruction is a DCloop instruction which allows instructions an offset of negative one away, as specified in offset field 203, to be executed a total of sixteen times, as specified in count field 202.

A third data chaining instruction is generated with a zero in opcode field 201, count field 202, offset field 203, and save pointer field 204. The third data chaining instruction is a DCStop instruction which indicates to SCSI manager 131 that all data chaining instructions have been executed.

The three data chaining commands are as follows:

| Opcode | Byte Count | Offset | Save Ptr. |
|---|---|---|---|
| $00002000 (DCMove) | $00000800 | $00003000 | $00000000 |
| $FFFFFFFF (DCLoop) | $00000010 | $FFFFFFFF | $00000000 |
| $00000000 (DCStop) | $00000000 | $00000000 | $00000000 |

When SCSI manager 131 executes the first data chaining instruction the first time, it stores the first (of sixteen) of the groups of $800 bytes of data to be stored at buffer address $2000. The buffer address is then incremented by $3000. The SCSI manager then executes the second data chaining instruction which loops to the first data chaining instruction to repeat the instruction. This time, the execution of the first data chaining instruction results in the storage of $800 bytes of data at buffer address $5000. Again, after the storage of data, the buffer address in the opcode field of the first data chaining instruction is incremented by $3000. The SCSI manager then re-executes the loop command which, in turn, loops again to the first data chaining instruction. This looping is repeated until the DCMove command is executed 16 times as specified in the count field of the DCLoop instruction and 16 groups of $800 bytes are stored in buffer addresses $3000 bytes apart, starting at buffer address $2000. Once SCSI manager 131 has looped 16 times, SCSI manager 131 executes the third data chaining command, a DCStop command, which terminates the SCSI managers execution of data chaining instructions in the data chaining instruction block.

In the prior art, non-contiguous memory locations could not be accessed without utilizing additional instructions to increment the address. Therefore, the prior art requires extra instructions. At best, the prior art could add one to the buffer address after a move instruction so that a new buffer address would be created. The present invention allows for almost unrestricted non-contiguous transfer of data.

As a second example, assume now that a SCSI printer is coupled to the SCSI interface that requires a header to be sent prior to the sending of the image to be printed. The image resides in memory as 25 contiguous pages and is rather large. Each page of data is the same size. Assume also that the image is to be printed in negative (or opposite) colors such that a routine must be inserted which inverts the data as it goes to the printer.

The present invention accomplishes the transfer in five data chaining instructions. A first data chaining instruction is generated with the starting buffer address of the heater information in opcode field 201, the number of bytes representing the header size to transfer, $200, in count field 202, the offset value, $0000, in offset field 203, and a zero in save pointer field 204. This instruction is a DCMove instruction which, when executed, allows $200 bytes of data representing the header information which is to be sent each time through the loop, as specified in count field 202, to be written from the buffer address in opcode field 201. After the data has been transferred, the value $0000, as specified in offset field 203, is added to the buffer address stored in opcode field 201 and stored in opcode field 201; therefore, the buffer address does not change. When this data chaining instruction is executed again, the same header information is transferred.

A second data chaining instruction is generated with a zero in opcode field 201, the address of the inversion routine in count field 202, and a zero in both offset field 203 and save pointer field 204. The second data chaining instruction is a DCSpecial instruction which allows SCSI manager 131 to relinquish control of the system so that the invention routine can manipulate the data before it arrives at the printer. In this manner, the data can be handled during the transfer so that system performance is not slowed because data is not in the correct format and must be re-formatted.

A third data chaining instruction is generated with the starting buffer address of the image in opcode field 201, the number of bytes being transferred, $4000, in count field 202, the offset value, $4000, in offset field 203, and a zero in save pointer field 204. This instruction is a DCMove instruction which, when executed, allows $4000 bytes of data (a page of the image), as specified in count field 202, to be written from buffer address specified in opcode field 201. After the data has been transferred, the value $4000, as specified in offset field 203, is added to the buffer address stored in opcode field 201 and stored in opcode field 201; therefore, since each page is $4000 bytes in size and the added offset is $4000 bytes is size, the new buffer address will be contiguous to the original buffer address. Upon repeated execution of this particular DCMove instruction, the next page of the image is transferred.

A fourth data chaining instruction is generated with a negative one in opcode field 201, the number 25 ($19) in count field 202, a negative three (−3) in offset field 203, and a zero in save pointer field 204. The fourth data chaining instruction is a DCLoop instruction which allows instructions that are located an offset of negative three away from the DCLoop instruction in the data chaining instruction block, as specified in offset field 203, to be executed a total of 25 ($19) times, as specified in count field 202. Therefore, the two previous DCMove instructions and the DCSpecial instruction are executed 25 ($19) times.

The fifth data chaining instruction is generated with a zero in opcode field 201, count field 202, offset field 203, and save pointer field 204. The fifth data chaining instruction is a DCStop instruction which indicates to SCSI manager 131 that all data chaining instructions have been executed.

The five generated data chaining commands are:

|    | Opcode    | Byte Count  | Offset      | Save Ptr.   |
|----|-----------|-------------|-------------|-------------|
| 1. | DCMove    | $00000200   | $00000000   | $00000000   |
| 2. | DCSpecial | $ (Address) | $00000000   | $00000000   |
| 3. | DCMove    | $00004000   | $00004000   | $00000000   |
| 4. | DCLoop    | $00000019   | $FFFFFFFD   | $00000000   |
| 5. | DCStop    | $00000000   | $00000000   | $00000000   |

When SCSI manager 131 executes the first data chaining instruction the first time, it transfers the $200 bytes of header data at the header buffer address specified in the opcode field of the first instruction. The header buffer address is not incremented after the transfer. Next the SCSI manager executes the second data chaining instruction which transfers control to the inversion routine located in memory at the address specified in the count field. Once the inversion routine is completed, SCSI manager 131 regains control and continues execution of the data chaining instructions.

The SCSI manager then executes the third data chaining instruction which transfers the first page of the image, $4000 bytes, and then increments the buffer address which points to the next page of the image stored in memory (i.e., by $4000 bytes).

Execution of the fourth data chaining instruction results in a loop to the first data chaining instruction to repeat the first, second and third instructions. Each iteration of the loop results in the header data, $200 bytes, and $4000 bytes of the image stored at a $4000 byte offset to be transferred in their inverted format. Again, after the transfer of data, the header buffer address in the opcode field of the first data chaining instruction remains unchanged, while the buffer address of the image, stored in the opcode field of the second data chaining instruction is incremented by $4000 bytes again.

The SCSI manager re-executes the loop command which, in turn, loops again to the first data chaining instruction. This looping is repeated until the three previous instructions are executed 25 ($19) times as specified in the count field of the DCLoop instruction. Once SCSI manager 131 has looped 25 ($19) times, SCSI manager 131 executes the fifth data chaining command, a DCStop command, which terminates the SCSI managers execution of data chaining instructions in the data chaining instruction block.

In the prior art, the image would have to be broken up and the data integrated with copies of the header information. This results in poor system performance. Also the prior art did not allow for SCSI manager 131 to relinquish control during data transfer. The DCSpecial command integrated into routines allows actions to be performed during data transfer such that system performance remains unhampered. Clearly, the data chaining mechanism offers these substantial advantages over the prior art system employing SCSI devices.

Processing Logic for the Present Invention

After the instructions are generated into the data chaining instruction block, the logic of SCSI manager 131 can begin execution. SCSI manager 131 automatically initializes at system start-up and is employed to perform an operation when a pointer is passed to a command descriptor block. If the command to be performed involves a transfer of data (e.g., a read or write operation), a pointer to the data chaining instruction block is passed which tells SCSI manager 131 the manner in which the data bytes transferred are to be manipulated during the data phase. SCSI manager 131 logic operates on the instructions in the block. This logic is described in the following section and in FIGS. 3–6.

Figure 3:
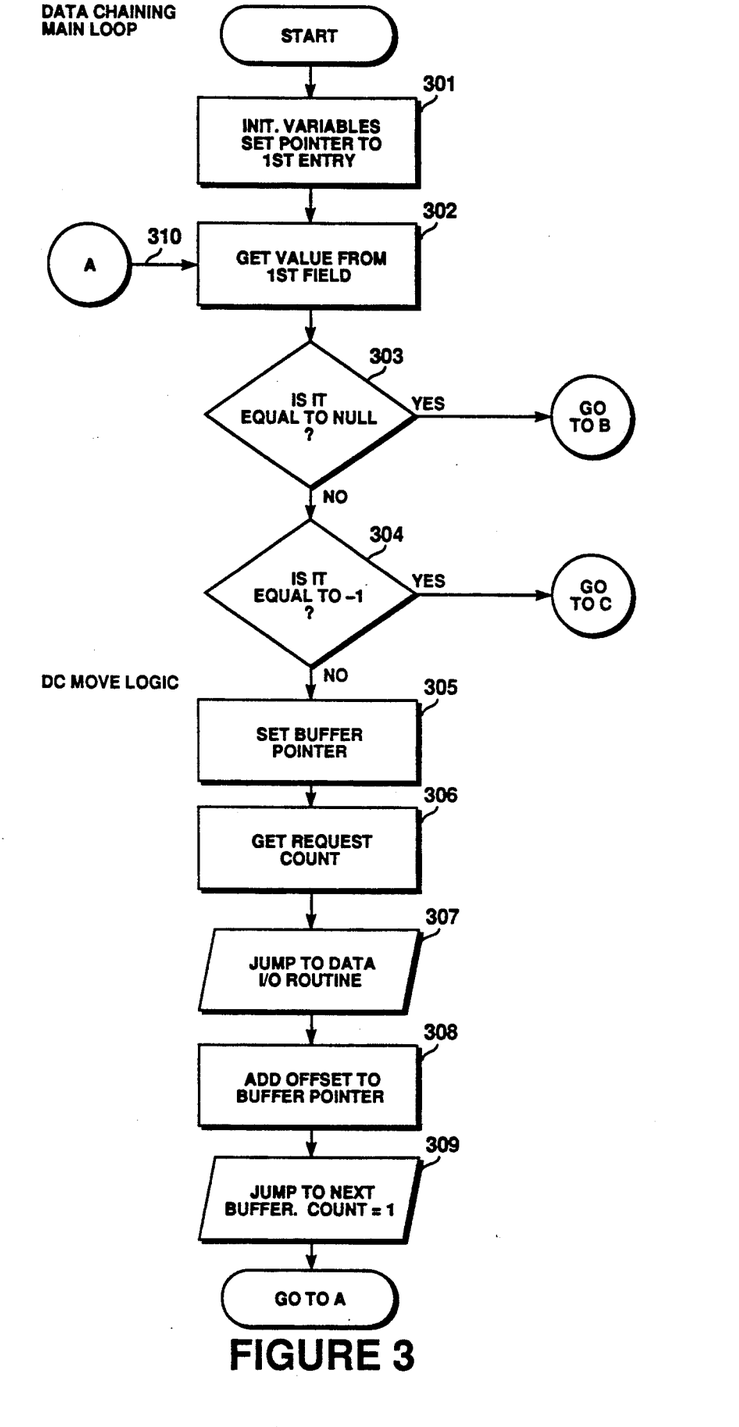
FIGS. 3, 4, 5 and 6 are flowcharts depicting how the SCSI manager processes the data chaining instructions.

The manner by which SCSI manager 131 executes the instructions is shown in FIG. 3. First, SCSI manager 131 initializes variables and sets the pointer to the first entry in the instruction block 301. SCSI manager 131 obtains the long word value from the first field of the first entry 302. If the first field is equal to zero 303, control passes to the logic beginning at B in FIG. 4 to determine if a DCSpecial command is to be executed. If the first field is not equal to zero, SCSI manager 131 tests whether the value of the first entry is equal to negative one 304. If the first field is equal to negative one (−1), control passes to the logic beginning at C in FIG. 6 to execute a DCLoop instruction. If the first field is not equal to negative one, SCSI manager 131 executes a DCMove instruction. Thus, SCSI manager 131 executes a DCMove instruction whenever the first field is not a zero or negative one (−1).

To execute the DCMove instruction, SCSI manager 131 sets the buffer pointer 305. The pointer is set to the buffer address in memory specified by the first field of the first entry. Next SCSI manager 131 obtains the value from the second field. This value is the byte count specifying the number of bytes to be transferred. With the buffer address and the number of bytes to be transferred, SCSI manager 131 jumps 307 to the code segment that executes an I/O operation depending on the command in the command descriptor block. If a read operation is to be invoked, a number of bytes equal to the byte count specified in the second field are read from the SCSI bus into memory beginning at the location in the buffer address in the first field. If a write operation is to be invoked, SCSI manager 131 writes a number of bytes equal to the number specified in the second field from memory addresses starting at the buffer address in the first field, out over the SCSI bus.

After the I/O operation, SCSI manager 131 returns to the data chaining instruction block and adds the value in the third field to the buffer address found in the first field 308. Hence, a new buffer address is created such that if this instruction was repeated in the future due to a DCLoop instruction passing control to this data chaining instruction or another data chaining instruction ahead of this one in the data chaining instruction block then this instruction would be executed with a different buffer address and new results would be produced. After the value in the third field has been added to the buffer address in the first field, SCSI manager 131 jumps to the next instruction in the data chaining instruction block 309 and control returns to A.

Figures 4, 5, 6:
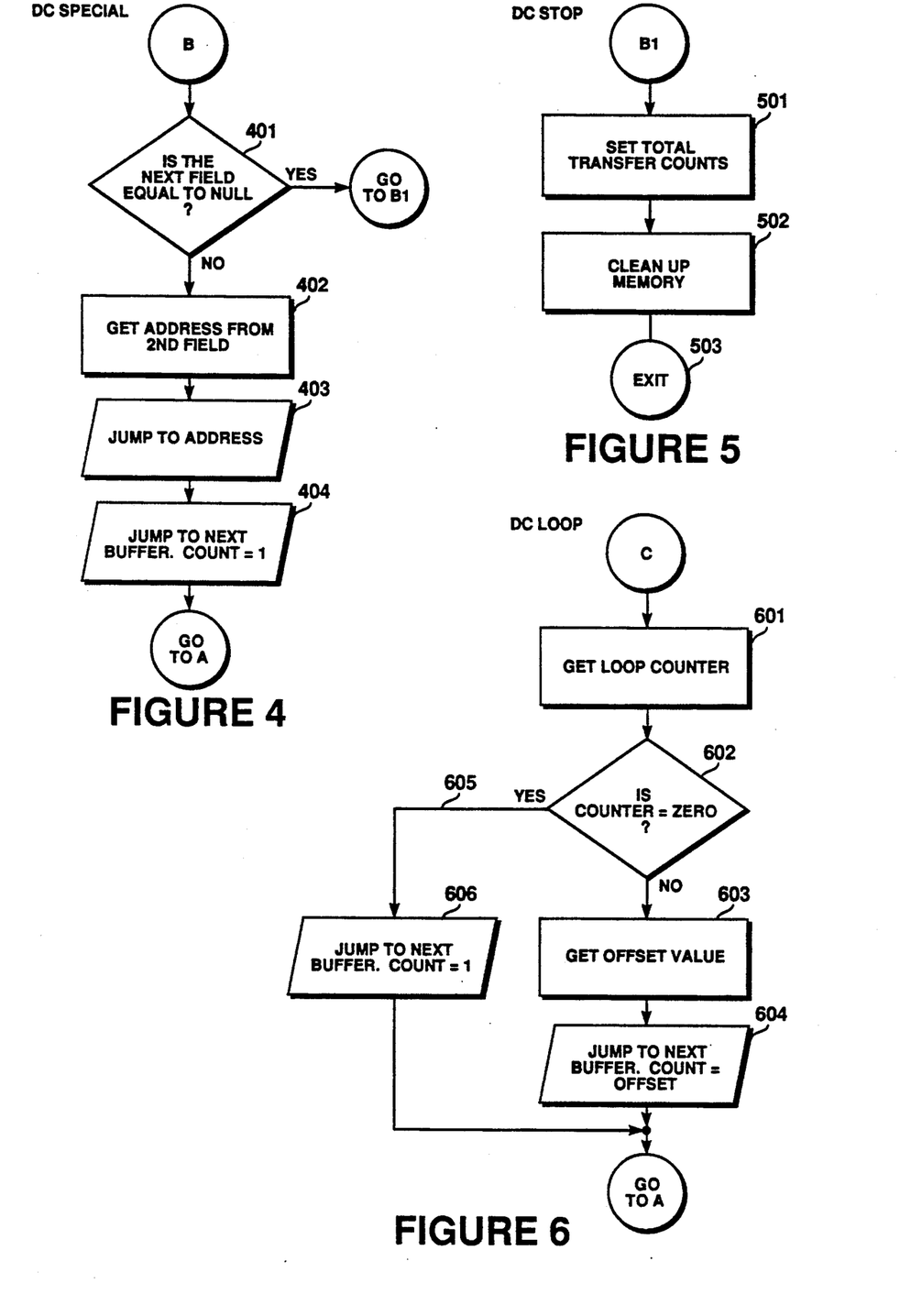

As specified above, if a zero is stored in the first field, control passes to B in FIG. 4. In this case, SCSI manager 131 test whether the second field contains a zero 401. If the second field contains a zero, control passes to the logic beginning at B1 in FIG. 5. If this is the case, SCSI manager 131 executes a DCStop command. If the second field does not contain a zero, the data chaining instruction is a DCSpecial instruction. SCSI manager 131 obtains the value in the second field 402 corresponding to a memory address. SCSI manager 131 passes control to the address specified in the second field 403 such that the execution of the data chaining instructions is halted until control returns to SCSI manager 131. SCSI manager 131 can jump to any memory location and is not limited to jumping to locations in the same memory bank.

Data handling routines are stored at the addresses specified in the second field. These data operations typically allow for preprocessing or post-processing of data. Some of the routines allow the data manipulations to occur on the data being written or read while the computer system to accommodates another batch of data. In this situation, the DCSpecial command allows routines to run without a loss of system performance or speed.

Once the routine located at the address specified in the second field has been completed, SCSI manager 131 jumps to the next instruction in the data chaining instruction block and returns control to A in FIG. 3.

As specified above, if a zero is stored in the first field and a zero is stored in the second field, control passes to B1 wherein a DCStop instruction is executed as in FIG. 5. The DCStop instruction terminates the execution by SCSI manager 131 of the data chaining instructions in the data chaining instruction block. When executing a DCStop instruction, SCSI manager 131 determines the total number of bytes transferred 501 and cleans up the memory 502. In cleaning up the memory 502, SCSI manager 131 releases any portion of memory required in the data manipulations so that the computer system can access those portions. After cleaning up memory, SCSI manager 131 exits 503 and returns control to the routine which initially called SCSI manager 131.

As specified above, if a value of negative one (−1) is stored in the first field, control passes to C in FIG. 6. FIG. 6 displays the manner in which SCSI manager 131 executes a DCLoop instruction. As shown in FIG. 6, SCSI manager 131 obtains the loop count stored in the second field 601. If the count is zero, SCSI manager 131 continues onto the next instruction in the data chaining instruction block 606 and returns control to A in FIG. 3.

If the count is not zero, SCSI manager 131 obtains the offset value located in the third field 603. This offset value, as discussed above, represents the number of instructions to jump in the data chaining instruction block. Next SCSI manager 131 decrements the loop counter by one, and, if the result is greater than zero, SCSI manager 131 jumps to the instruction in the data chaining instruction block located the offset number of instructions from the DCLoop instruction 604. Control then returns to A in FIG. 3 with the instruction pointer located at the instruction to which SCSI manager 131 looped.

SCSI manager 131 repeats the execution of the instructions in the data chaining instruction block between the DCLoop instruction and the offset number of instructions until the loop count in the second field of the DCLoop instruction is exhausted. At that time, SCSI manager 131 continues onto the next instruction beyond the DCLoop instruction in the data chaining instruction block and continues with its execution.

Although this invention has been shown in relation to the operating system, it should not be considered so limited. Rather, it is limited only by the appended claims.

Thus, a mechanism has been described which allows the specification of multiple source or destination buffers without the need to have one entry for each buffer address.

We claim:

1. A computer system comprising a bus, a processor coupled to said bus; a memory means coupled to said bus for storing data; a plurality of Small Computer Standard Interface (SCSI) devices, wherein a SCSI manager provides routines and data structures for controlling communication between said plurality of SCSI devices, a mechanism for exchanging information between said SCSI devices including:

first means coupled to said bus for moving data between said SCSI devices, said means for moving including means for generating at least one move operation, wherein said means for generating has at least a first opcode field, a first count field, and a first offset field, wherein said first opcode field contains a move command represented as a buffer address, said count field specifies a number of bytes to transfer, and said first offset field contains an offset value to said buffer address; and second means coupled to said bus for repeating an operation, wherein said means for repeating includes means for generating at least one looping operation, said means for generating at least one looping operation having at least a second opcode field, a second count field, and a second offset field, wherein said second opcode field specifies the looping operation, said second count field contains a loop count, said second offset field contains an offset number of operations for repeating in said at least one looping operation;

third means coupled to said bus for stopping the execution of said operations by said SCSI manager, wherein said SCSI manager halts execution of said move operations and said looping operations;

wherein said at least one move operation and said at least one looping operation are ordered for sequential execution by said SCSI manager, and further wherein said SCSI manager transfers said number of bytes to or from said buffer address and subsequently adds said offset value to said buffer address to create a current buffer address in one atomic operation upon execution of said at least one move operation and said SCSI manager repeats operations within said offset number of said looping operation in said sequential order until said loop count is exhausted upon execution of said at least one looping operation, wherein said at least one move operation accomodates a plurality of buffer addresses;

said SCSI manager transferring said number of bytes to or from said current buffer address when said SCSI manager re-executes said at least one move operation, wherein transfers occur between SCSI devices by allowing said at least one move operation to specify multiple source or destination buffers.

2. The computer system as in claim 1 further comprising a fourth means coupled to said bus for interrupting the execution of said operations, said means for interrupting including means for generating at least one interrupt operation, said means for generating at least one interrupt operation having a fourth opcode field, a fourth count field, and a fourth offset field, wherein said fourth opcode field specifies the special command, said fourth count field contains a branch address to a routine, and said fourth offset field contains data defined by said routine, wherein said SCSI manager relinquishes control of said SCSI either before or after said one move operation or after said one looping operation causing the execution of said remaining operations by said SCSI manager to be halted for a predetermined time during which said routine is executed, such that after said predetermined time said SCSI manager assumes control and completes execution of said remaining operations.

3. The computer system as in claim 2 wherein each of said fields comprises a long word.

4. The computer system as in claim 1 wherein said buffer address and said current buffer address are non-contiguous.

5. A computer system comprising a bus, a processor coupled to said bus; a memory means coupled to said bus for storing data; a plurality of Small Computer Standard Interface (SCSI) devices coupled to said bus, wherein a SCSI manager provides routines and data structures for controlling communication between said plurality of SCSI devices, said computer system further comprising a mechanism for exchanging information between said SCSI devices including:

first means coupled to said bus for moving data between said SCSI devices, said means for moving including means for generating at least one move operation, wherein said means for generating has at least a first opcode field, a first count field, and a first offset field, wherein said first opcode field contains a move command represented as a buffer address, said count field specifies a number of bytes to transfer, and said first offset field contains an offset value to add to said buffer address; and second means coupled to said bus for repeating an operation, wherein said means for repeating includes means for generating at least one looping operation, said means for generating at least one looping operation having at least a second opcode field, a second count field, and a second offset field, wherein said second opcode field specifies the looping operation, said second count field contains a loop count, said second offset field contains an offset number of operations for repeating in said at least one looping operation;

wherein said at least one move operation and said at least one looping operation are ordered for sequential execution by said SCSI manager, and further wherein said SCSI manager transfers said number of bytes to or from said buffer address and subsequently adds said offset value to said buffer address to create a current buffer address in one atomic operation upon execution of said at least one move operation and said SCSI manager repeats operations within said offset number of said looping operation in said sequential order until said loop count is exhausted upon execution of said at least one looping operation, wherein said at least one move operation accommodates a plurality of buffer addresses;

said SCSI manager transferring said number of bytes to or from said current buffer address when said SCSI manager re-executes said at least one move operation, wherein transfers occur between SCSI devices by allowing said at least one move operation to specify multiple source or destination buffers.

6. The computer system as in claim 5 wherein said buffer address and said current buffer address are non-contiguous.

7. The computer system as in claim 5 further comprising a third means coupled to said bus for stopping the execution of said operations by said SCSI manager, said means for stopping including means for generating a stop operation, said means for generating a stop operation having a third opcode field, a third count field, and a third offset field, wherein said third opcode field specifies a stop command, and said third count and offset fields both contain zero, such that said SCSI manager halts execution of said move operations and said looping operations upon execution of said stop operation.

8. The computer system as in claim 5 further comprising a fourth means coupled to said bus for interrupting the execution of said operations, said means for interrupting including means for generating at least one interrupt operation, said means for generating at least one interrupt operation having a fourth opcode field, a fourth count field, and a fourth offset field, wherein said fourth opcode field specifies a special command, said fourth count field contains a branch address to a routine, and said fourth offset field contains data defined by said routine, wherein said SCSI manager relinquishes control of said SCSI either before or after said one move operation or after said one looping operation causing the execution of said remaining operations by said SCSI manager to be halted for a predetermined time during which said routine is executed, such that after said predetermined time said SCSI manager assumes control and completes execution of said remaining operations.

9. A computer system comprising a bus, a processor coupled to said bus; a memory means coupled to said bus for storing data; a plurality of Small Computer Standard Interface (SCSI) devices coupled to said bus, wherein a SCSI manager provides routines and data structures for controlling communication between said plurality of SCSI devices; a mechanism for exchanging information between said SCSI devices including:

first means coupled to said SCSI manager for moving data between SCSI devices, said means for moving including means for generating at least one move operation, wherein said means for generating has at least a first opcode field, a first count field, and a first offset field, wherein said first opcode field contains a move command represented as a buffer address, said count field specifies a number of bytes to transfer, and said first offset field contains an offset value to add to said buffer address, wherein said SCSI manager transfers said number of bytes to or from said buffer address and subsequently adds said offset value to said buffer address to create a current buffer address in one atomic operation upon execution of said at least one move operation, wherein said move command accommodates a plurality of buffer addresses; and second means coupled to said SCSI manager for repeating said at least one move operation, wherein said SCSI manager transfers said number of bytes to or from said current buffer address when said SCSI manager re-executes said at least one move operation, wherein information is exchanged between SCSI devices by having each move operation specify multiple source or destination buffers.

10. The computer system defined in claim 9 wherein said means for repeating includes means for generating at least one looping operation having at least a second opcode field, a second count field, and a second offset field, wherein said second opcode field specifies the looping operation, said second count field contains a loop count, said second offset field contains an offset number, wherein said SCSI manager repeats operations within said offset number of said looping operation until said loop count is exhausted upon execution of said at least one looping operation.

11. The computer system as defined in claim 9 further comprising means for stopping execution of said move operations and said looping operations.

12. The computer system as defined in claim 11 wherein said means for stopping execution includes means for generating a stop operation, said means for generating a stop operation having a third opcode field, a third count field, and a third offset field, wherein said third opcode field specifies a stop command, and said third count and offset fields both contain zero, wherein said SCSI manager halts execution of said move operations and said looping operations upon execution of said stop operation.

13. The computer system as defined in claim 9 further comprising means for interrupting execution of said operations, wherein said SCSI manager relinquishes control of said SCSI either before or after said one move operation or after said one looping operation causing the execution of said remaining operations by said SCSI manager to be halted for a predetermined time during which said routine is executed, such that after said predetermined time said SCSI manager assumes control and completes execution of said remaining operations.

14. The computer system as defined in claim 13 wherein said means for interrupting execution of said operations includes means coupled to said bus for generating at least one interrupt operation, said means for generating an interrupt operation having a fourth opcode field, a fourth count field, and a fourth offset field, wherein said fourth opcode field specifies the special command, said fourth count field contains a branch address to a routine, and said fourth offset field contains data defined by said routine, wherein said SCSI manager relinquishes control of said SCSI either before or after said one move operation or after said one looping operation causing the execution of said remaining operations by said SCSI manager to be halted for a predetermined time during which said routine is executed, wherein after said predetermined time said SCSI manager assumes control and completes execution of said remaining operations.

15. In a computer system having a bus and utilizing a Small Computer Standard Interface (SCSI), wherein a SCSI manager provides routines and data structures for controlling communication between a plurality of SCSI devices, a method for exchanging information between said SCSI devices said method comprising the steps of:

moving data between said SCSI devices, said step of moving including the step of generating at least one move operation comprising a first opcode field, a first count field, and a first offset field, wherein said first opcode field contains a move command represented as a buffer address, said count field specifies a number of bytes to transfer, and said first offset field contains an offset value to add to said buffer address, wherein at least one move operation accommodates a plurality of buffer addresses;

repeating an operation, wherein the step of repeating includes the step of generating at least one looping operation comprising a second opcode field, a second count field, and a second offset field, wherein said second opcode field specifies the looping operation, said second count field contains a loop count, and said second offset field contains an offset number of operations for repeating in said at least one looping operation;

executing each of said at least one move operation wherein said SCSI manager either transfers said number of bytes to or from said buffer address and subsequently adds said offset value to said buffer address to create a current buffer address in one atomic operation; and executing said looping operation wherein said SCSI manager repeats operations within said offset number of each said looping operation, wherein said SCSI manager repeats said at least one move instruction until said loop count is exhausted wherein said SCSI manager transfers said number of bytes to or from said current buffer address, wherein transfers occur between SCSI devices by allowing said at least one move operation to specify multiple source or destination buffers.

16. The method as in claim 15 wherein said buffer address and said current buffer address are non-contiguous.

17. The method as in claim 15 further including the steps of:

generating a stop operation comprising a third opcode field, a third count field, and a third offset field, wherein said third opcode field specifies the stop operation; and executing said stop operation wherein said SCSI manager completes execution of said operations.

18. The method as in claim 15 further including the step of generating at least one interrupt operation a fourth opcode field, a fourth count field, a fourth offset field, and a fourth save pointer field, wherein said fourth opcode field specifies an interrupt operation, said fourth count field contains a branch address to a routine, and said fourth offset field contains data defined by said routine; and executing said special instruction such that said SCSI manager relinquishes control of said SCSI either before or after said at least one move operation or after said at least one loop instruction causing the execution of said operations by said SCSI manager to be halted for a predetermined time during which said routine is executed, such that after said predetermined time said SCSI manager assumes control and completes execution of said operations.

19. In a computer system having a bus and utilizing a Small Computer Standard Interface (SCSI), wherein a SCSI manager provides routines and data structures for controlling communication between a plurality of SCSI devices, a method for exchanging information between said SCSI devices, said method comprising the steps of:

moving data between said SCSI devices, said step of moving including the step of generating at least one move operation comprising a first opcode field, a first count field, and a first offset field, wherein said first opcode field contains a move command represented as a buffer address, said count field specifies a number of bytes to transfer, and said first offset field contains an offset value to add to said buffer address, wherein said at least one move operation accommodates a plurality of buffer addresses;

repeating an operation, wherein the step of repeating includes the step of generating at least one looping operation comprising a second opcode field, a second count field, and a second offset field, wherein said second opcode field specifies the looping operation, said second count field contains a loop count, and said second offset field contains an offset number of operations for repeating in said at least one looping operation;

generating a stop operation comprising a third opcode field, a third count field, and a third offset field, wherein said third opcode field specifies the stop operation;

executing each of said at least one move operation such that said SCSI manager either transfers said number of bytes to or from said buffer address and subsequently adds said offset value to said buffer address to create a current buffer address in one atomic operation; and executing said looping operation wherein said SCSI manager repeats operations within said offset number of each said looping operation, such that said SCSI manager repeats said at least one move instruction until said loop count is exhausted wherein said SCSI manager transfers said number of bytes to or from said current buffer address, wherein transfers occur between SCSI devices by allowing said at least one move operation to specify multiple source or destination buffers; and executing said stop operation such that said SCSI manager completes execution of said operations.

20. The method as in claim 19 further including the steps of:

generating at least one interrupt operation a fourth opcode field, a fourth count field, a fourth offset field, and a fourth save pointer field, wherein said fourth opcode field specifies an interrupt operation, said fourth count field contains a branch address to a routine, and said fourth offset field contains data defined by said routine; and executing said special instruction such that said SCSI manager relinquishes control of said SCSI either before or after said at least one move operation or after said at least one loop instruction causing the execution of said operations by said SCSI manager to be halted for a predetermined time during which said routine is executed, wherein after said predetermined time said SCSI manager assumes control and completes execution of said operations.

21. The method as in claim 20 wherein each of said fields comprises a long word.

* * * * *